Nov. 25, 1947. S. B. STAFFORD Re. 22,942

TEXTILE PRINTING APPARATUS

Original Filed Oct. 20, 1939 4 Sheets-Sheet 1

Inventor

Stephen B. Stafford

By Clayton R. Jenkes

Attorney

Witness: Charles H. Amidon

Nov. 25, 1947. S. B. STAFFORD Re. 22,942

TEXTILE PRINTING APPARATUS

Original Filed Oct. 20, 1939 4 Sheets-Sheet 2

Inventor

Stephen B. Stafford

By Clayton R. Jenkins

Attorney

Witness: Charles H. Amidon

Nov. 25, 1947. S. B. STAFFORD Re. 22,942

TEXTILE PRINTING APPARATUS

Original Filed Oct. 20, 1939 4 Sheets-Sheet 3

Inventor

Stephen B. Stafford

By Clayton R. Jenks

Attorney

Witness: Charles H. Amidon

TEXTILE PRINTING APPARATUS

Original Filed Oct. 20, 1939 4 Sheets-Sheet 4

VARIABLE VOLTAGE ARMATURE CIRCUIT

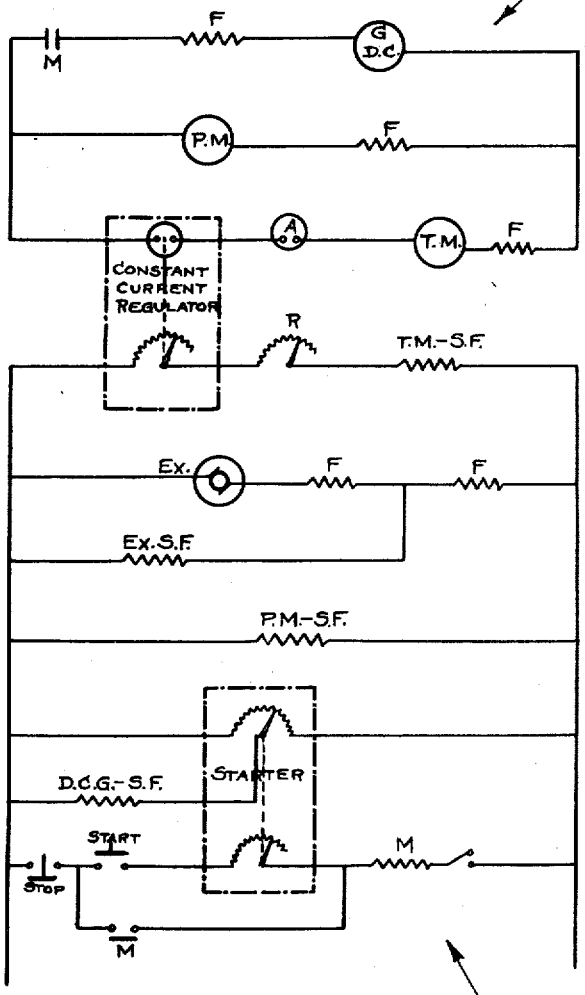

LEGENDS:—

M – MAIN LINE CONTACTOR & COIL

A – AMMETER

F – SERIES FIELD

S.F. – SHUNT FIELD

P.M. – PRINTER MOTOR

G.D.C. – D.C. GENERATOR

T.M. – TENSION MOTOR

Ex. – EXCITER

R. – VARIABLE RHEOSTAT

FIELDS AND CONTROL CIRCUIT

Fig. 7

Inventor

Stephen B. Stafford

By Clayton C. Jenks

Attorney

Witness: Charles H. Amidon

Reissued Nov. 25, 1947 Re. 22,942

UNITED STATES PATENT OFFICE 22,942

TEXTILE PRINTING APPARATUS

Stephen B. Stafford, Oxford, Mass., assignor to Rice Barton Corporation, a corporation of Massachusetts Original No. 2,281,211, dated April 28, 1942, Serial No. 300,433, October 20, 1939. Application for reissue February 11, 1947, Serial No. 727,931

13 Claims. (Cl. 101—178)

This invention relates to textile printing apparatus and more particularly to mechanism for presenting a fabric to the printing machine.

A textile printing machine of standard construction comprises one or more engraved printing rolls and a backing cylinder arranged with associated parts for printing a strip of fabric continuously. Owing to variations in the yarn and the weave, the fabric may vary in width as it runs, or it may crease or fold or pull out of shape, so that it runs sideways or wanders or becomes distorted in shape, and it has been difficult to secure an accurate registration of the fabric with the engraved surface on the printing roll. Hence, it has been customary to have the engraving extend on the roll slightly farther than the width of the fabric, and to take up the printing ink beyond the edges of the fabric by means of wider back gray cloth which travels with the goods to be printed. But that requires frequent cleaning of the back gray cloth, and the excess of ink at the edges may result in spoiling some of the fabric.

A standard procedure and apparatus for feeding a long web of fabric to a printing machine has comprised mounting a roll of the fabric on a shaft carrying a brake drum which has a weighted strap applying pressure to the drum. This brake thus holds back on the fabric as it is drawn forward by the printing press and so keeps it under some tension. But, as the fabric unwinds from the roll, the radius of the roll decreases and the roll rotates at an increasingly faster rate, so that the tension applied by the brake bank gradually changes, and the fabric is not fed forward to the printer under uniform conditions.

It has also been customary to use a helical spreader comprising a roll having screw threads thereon extending in opposite directions from the center which tends to spread the cloth. This spreader located in advance of the printing machine will take out scrimps or folds in the fabric, but it will not track the fabric or feed it forward with its edges held uniformly in alignment with the edges of the engraved surface of the printing roll. In order to accomplish this tracking, the operator has heretofore forcibly moved the roll of fabric along its supporting shaft and thus has attempted a crude adjustment, but this procedure is neither accurate nor automatic.

A further problem has been presented in the use of the back gray cloth which is used as a blotter to take up excess ink that comes through the fabric or around the edges thereof. If the back gray goes wild in its travel, it may crease or wander or become distorted or of variable width; and owing to any of these defects, the back gray may lead astray the fabric that is to be printed and so result in a non-uniform printing operation. The back gray should be led forward to the printing press under controlled conditions which are substantially similar to those required for the goods to be printed.

When the supply roll of fabric or back gray cloth has become exhausted, it has been necessary heretofore to stop the printing machine and sew onto the fabric or cloth the leading end of another roll so that the new material will be pulled forward through the machine. The printing press, however, leaves a defective mark on the fabric when standing still, and it is necessary to cut the fabric and remove such defective portions. It is desirable that the machine run continuously and that both the goods to be printed and the back gray cloth be fed forward in such a manner that the machine need not be stopped during a long period of operation. So many problems have been presented in the continuous printing of fabric, that the seconds or goods of inferior grade have often run as high as 20%. This uneconomic production is caused largely by poor registration of the fabric with the printing roll, and this is in turn caused by the uncontrolled passage of the fabric and the back gray from their sources of supply to the printer.

It is, therefore, the primary object of this invention to overcome the above problems and to provide an apparatus for feeding the fabric to a printing machine under conditions tending to produce a uniform product, and particularly to provide mechanism which will feed the fabric forward under uniform tension and at a uniform width and in registration with the printing roll.

A further object is to provide such an apparatus wherein the printing conditions may be fully controlled by the operator and the apparatus will operate automatically to produce the desired results.

Another object of the invention is to provide an automatically operated mechanism for holding either the fabric or the back gray cloth, or both, under any desired tension so as to feed the same properly to the printing press.

A further object is to insure that the fabric shall have a uniform width and that it track with the printing roll without requiring repeated manual adjustment of the mechanism.

Another object is to control the speed of movement of various portions of either the fabric or the back gray, or both, and to accumulate a supply thereof so that the printing machine may operate normally and continuously while a new roll of fabric or back gray cloth is being attached to the end of the one going through the machine.

A further object is to provide mechanism which will insure that both the fabric and the back gray cloth are fed forward under uniform conditions so that the apparatus will operate substantially automatically and serve to print fabric continuously and satisfactorily. Other objects pertaining to the details of construction and the arrangement of the parts will be apparent in the following disclosure.

Referring to the drawings, I have there shown a complete assembly of all of the primary mechanisms which may be used to satisfy all of the above objects; but certain of these mechanisms may be employed by themselves to attain one or more of the desired objects and various simplified constructions may be used within the scope of this invention.

In the drawings:

Fig. 7 is a substantially complete wiring diagram for the same.

Figure 1:
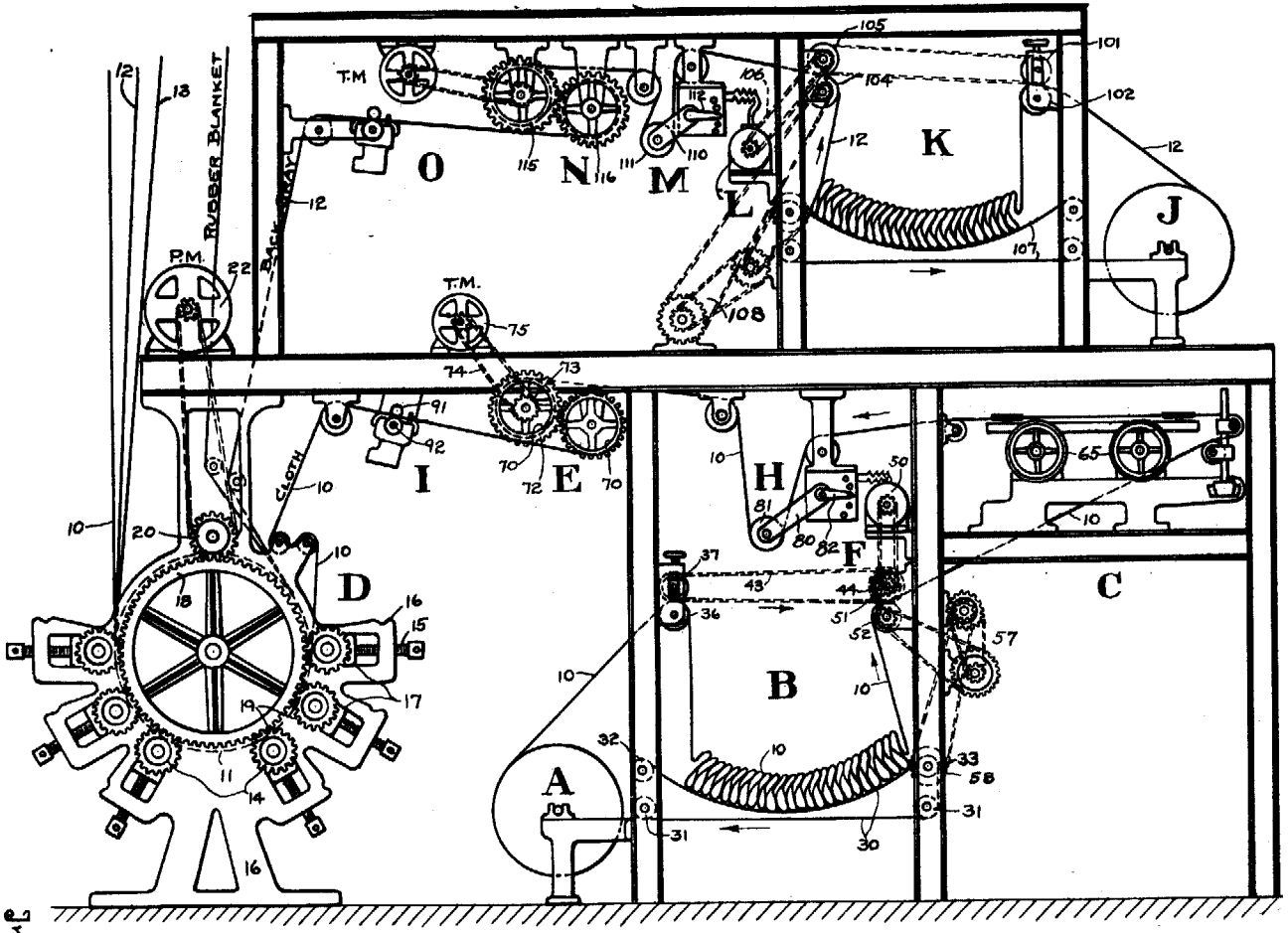
Fig. 1 is a diagrammatic elevation of the various mechanisms required to feed to the printing press both the fabric and the back gray cloth under controlled conditions.

In order to satisfy all of the above objects, I propose to feed the fabric forward from a roll A to a scray B at a predetermined rate, and to remove the fabric continuously from that scray at a slightly reduced rate so that the scray will accumulate fabric therein. When the roll A has become unwound, a new roll may be inserted in its place and the free ends of the two strips of fabric fastened together during the period that the fabric is being fed forward from the scray to the printing machine, and thus not require stopping the printing machine motor to permit this change. From the scray, the fabric may pass to a spreader C where it is brought to a uniform width, or this spreader may be omitted. The fabric on the roll A may have been previously stretched on a tentering frame, so that it has a substantially uniform width when it reaches the spreader C; and the latter is then used only for the purpose of insuring that the fabric retain its uniform width and so may be made to track with the printing roll. The printing press D is driven by a suitable motor, and this mechanism tends to pull the cloth forward at a given rate. A tensioning device E holds back on the fabric as it is pulled forward and serves to impose a predetermined tension thereon. Various types of tension mechanism may be employed for this purpose, but I prefer to use a motor which is over driven by the fabric and caused to act as an electrical generator, thus providing a braking action on the movement of the fabric. The fabric is fed from the scray by a motor driven mechanism F, and a synchronizing mechanism H is provided to insure a proper coordination of the speed of this motor with that of the printing press and to aid the tensioning device E. The fabric therefore passes to the printing press under a uniform tension and with its width maintained. A guide mechanism I is provided to insure that the edges of the fabric track with the printing roll or are aligned with the intaglio engraving thereon, so that the engraving need not be made longer than the width of the fabric.

Similarly, if a back gray cloth is to be used, it may be fed from a supply roll J through a scray K by means of a motor driving mechanism L which has its speed adjusted by the electrical control device M. The back gray is held under a proper tension by means of the tension motor mechanism N, and the cloth is likewise tracked by means of a suitable type of guider O. This insures that the back gray and the fabric will be properly fed together into the printing press and each under a suitable tension and aligned with the other as is required for the printing operation.

The textile printing machine may be of any suitable construction, such as the standard Rice Barton printing machine, which is adapted for continuously printing a strip of fabric 10 that is fed thereto. This construction may comprise a backing cylinder 11 around which the cloth fabric is led, together with a back gray cloth 12 and a rubber blanket 13, if either of these is to be used. One or more printing rolls 14 are arranged to engage the cloth, and each is held under pressure thereagainst by means of the adjustable screw 15 suitably mounted on the framework 16 and arranged to thrust forward the slide block 17 which carries the shaft of the printing roll. A large central gear 18 meshes with gears 19 on the printing roll shafts and thus serves to drive the printing rolls which in turn drive the backing cylinder 11 that is mounted for free rotation on its supporting shaft. The driving gear 18 is driven by a further gear 20 mounted on a suitable jack shaft, and this is in turn driven through a chain or belt connection by an electric motor 22, herein termed the printer motor. The cloth is fed to the printer D from any suitable source of supply, such as the roll A removably mounted on a suitable support, and standard constructional features, such as rollers, etc., are suitably mounted on the framework of the apparatus or of the building for carrying the fabric from that roll to the printer. These various accessory features need not be further described.

One feature of this invention involves the provision of mechanism which will feed the fabric from the supply roll A to a receptacle where an excess accumulates in sufficient amount so that, when the end of the roll A has been reached the leading end of a new roll may be sewed to the former while the fabric continues to be removed from that receptacle and passed to the printer. For this purpose, I may utilize various types of mechanism, but I preferably employ a scray. This scray may be a simple form of receptacle in which an excess of fabric accumulates in loose folds before passing to the printer. The preferred construction, which is illustrated diagrammatically in the drawings, comprises an endless belt so arranged that as the fabric is fed into the scray, it piles up on this belt in folds which are carried forward to the exit side where the fabric is withdrawn continuously by a motor driven feeding mechanism.

Figure 4:
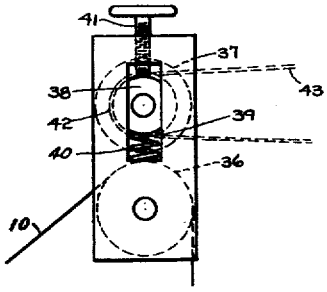
Fig. 4 is an enlarged detail of the mounting for the driving rolls which feed the fabric to the scray.

In this construction an endless belt 30 of suitable material, such as a fabric web, is mounted to pass under two lower rolls 31 and over two upper rolls 32 and 33. If the belt is carried on a chain, sprockets will be used. One of the upper rolls or sprockets 33 is driven from a suitable source of power, as will be described. The belt 30 travels in the direction of the arrow of Fig. 2 under the impelling force of the driving roll. Hence, as the fabric is led into the scray, it piles up in loops in an orderly manner on the traveling belt, and these loops are transported slowly towards the exit end of the device. The fabric is fed to the scray by means of two power driven rolls 36 and 37 suitably mounted on the framework. The lower roll 36 is supported on fixed bearings (Fig. 4) and the upper roll 37 has its shaft carried on two blocks 38 slidably mounted in two spaced guideways 39 suitably formed in the supporting frame. A compression spring 40 supports each block 38 and tends to lift the upper roll 37 out of contact with the lower roll. A screw 41 is mounted in the frame in engagement with the block 38 and a hand wheel or a wrench applied thereto serves to turn the screw and adjust the position of the slidable bearing block. The upper roll 37 is positively driven by a pulley 42 on the shaft of the upper movable roll 37 which is in turn driven by a belt connection 43 from a pulley 44.

To provide for a continuous movement of fabric to the printer, the scray feeds are so operated as to feed the cloth into the scray faster than it is removed therefrom. For this purpose, I may have two separate electric motors with their speeds properly controlled by rheostats, and connected to the rolls through clutches or other mechanism. It is preferred, however, to synchronize the speeds mechanically, as illustrated. To that end, the electric motor 50 of the mechanism F is belted to drive two rolls 51 and 52 which are suitably mounted on a standard in such a manner that they serve to draw the fabric from the scray. A sprocket 53 (Fig. 2) on the shaft of the motor 50 is connected through a chain 54 with another sprocket 55 which is fixed on the shaft carrying the upper roll 51. This shaft carries the pulley 44 which drives the rolls 36 and 37. This pulley 44 is made slightly larger than the pulley 42 so that the rolls 36 and 37 travel faster than do the rolls 51 and 52. This speed ratio is preferably such that a considerable yardage of fabric accumulates in the scray while the supply roll A is unwinding. This gives ample time so that the operator may sew onto the end of the fabric going to the printer the forward end of a new fabric before all of the accumulated material has been fed out of the scray.

Figure 2:
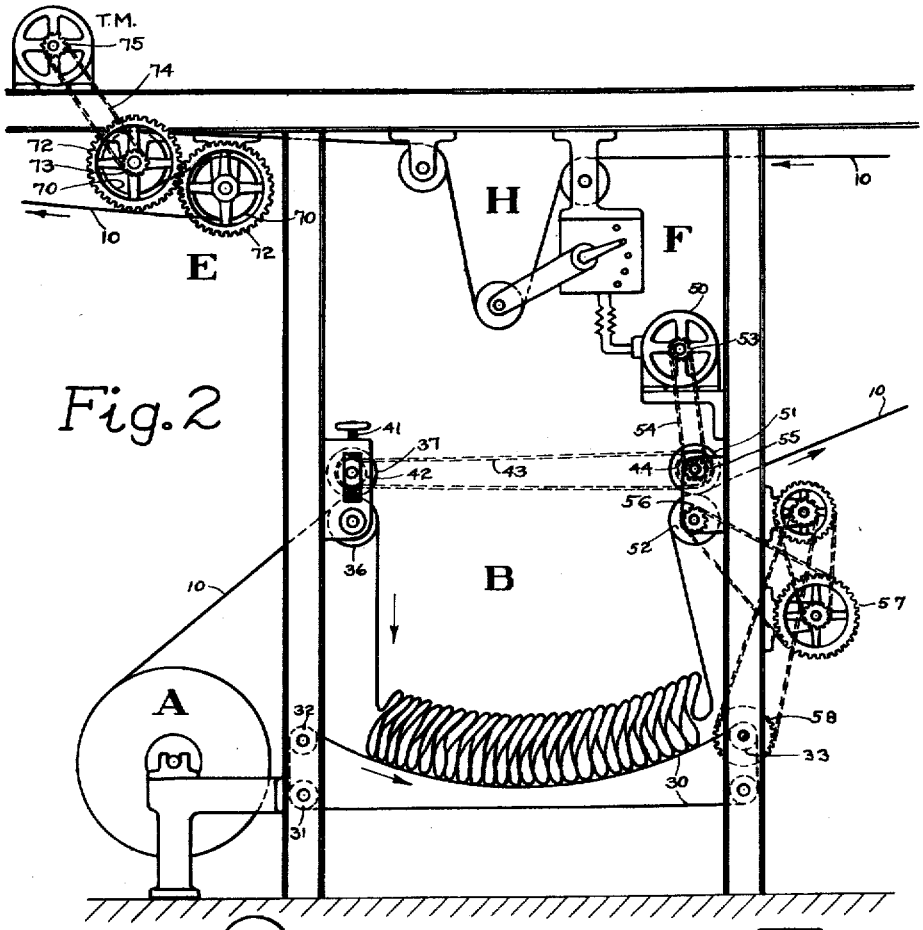
Fig. 2 is an enlarged detail of a portion of the mechanism of Fig. 1 pertaining to the feeding of the fabric to be printed.

It is also desirable to coordinate the speed of the scray belt 30 with that of the feed rolls 51 and 52. Hence, I provide a sprocket 56 on the shaft carrying the lower roll 52 which drives a reduction gearing 57 comprising a set of sprockets and chains arranged as shown. This in turn drives the sprocket 58 on the upper shaft carrying the roll 33 which drives the belt 30. The sprocket and pulley sizes may be such as to give a speed ratio of 100 to 1, or other suitable ratio, for the fabric feeding roll 51 and the belt driving roll 33. These are so arranged that the endless belt 30 moves at a slow rate just sufficient to insure that as the fabric forms into loops in the scray, as shown in Fig. 2, those loops will be moved towards the exist fast enough to provide a steady supply of the fabric at the righthand end of the scray and ample space at the lefthand side for further loops to be formed. If desired, suitable clutch mechanism may be provided for stopping the belt 30. Also, the sprocket 58 and associated reduction speed mechanism may be driven by the shaft of the roll 36, so that the belt stops when the in-feed movement of the fabric is stopped by separating the driving rolls 36 and 37.

The fabric may be suitably prepared for printing prior to its being rolled into the roll A. For example, it may be first tentered on a standard tentering machine in order to bring it to a required width, so that it need not be thereafter stretched before it is led to the printer. In this case, the tentering frame C may be omitted from the present construction; or a very short tentering frame may be used, not for the purpose of stretching the cloth to a permanent wider condition, but merely for the purpose of smoothing out wrinkles and getting the cloth in a suitable condition for its subsequent alignment with the printing rolls.

If a tentering frame is to be used in this combination, it may comprise any suitable construction of the type of the Winsor and Jerauld tentering machine that is standard on the market. This comprises, as illustrated diagrammatically in Fig. 3, two endless chain belts 61 riding on two sets of sprockets 62 and which are so located that the inner belt-run diverges in its travel forward. Each of these belts has a set of automatically actuated clamping blocks 64 mounted thereon and so arranged that as the belts pass around the sprockets the clamping blocks automatically engage and disengage the edges of the fabric 10. Thus, they serve to smooth out or to stretch the fabric between them, as may be required. Suitable adjustment mechanism 65 may be employed for changing the angle of divergence of these belts so as to control the ultimate width of the fabric. The endless belts may be driven by suitable mechanism synchronized with the cloth movement, and any required constructional features well known in the industry may be used to insure that the fabric is properly spread out. Helically threaded spreading rolls of standard type may be used in place of the tentering frame, if desired.

A primary feature of this invention involves applying tension to the fabric just prior to its entering the printing zone and holding it under a substantially uniform tension. To this end, I preferably apply a braking mechanism which tends to hold back on the cloth as it is drawn forward by the printing machine. I may utilize any suitable mechanical, hydraulic or electrical brake which is automatic in its operation. I, however, prefer to employ a constant speed electric motor which is over driven by the running cloth at a higher rate than its normal speed and thus causing it to act as an electric generator. Various types of electric motor and electrical wiring arrangements may be employed, as will be readily understood by one skilled in the electrical art.

A simple construction comprises a direct current electric motor of the type adapted to run at a constant speed with a constant load and to vary in torque directly with variations in the current input. When such an electric motor is connected into an electric circuit so that it tends to drive the fabric at a rate of, say, 75% of that at which the printer draws the fabric forward, the motor initially aids in moving the cloth when the machine is started, but when the cloth is moving at full speed the motor is over driven and becomes a generator of electricity and so applies a counterforce tending to slow down the rate of cloth movement. The faster the cloth moves, the greater is the countertorque applied by the motor-generator to increase the tension on the cloth. The tension motor T. M. has the same general characteristics as another motor with which it is connected in parallel, and this second motor is preferably the printing machine driving motor, herein termed the printer motor P. M. The tension motor T. M. is so connected to driving rolls 70 frictionally engaging the fabric that they will normally drive the fabric at a slower speed than that of the speed of the printer motor, and that rate of drive of the motor T. M. may be suitably regulated to obtain the desired effect.

Figures 3, 6:
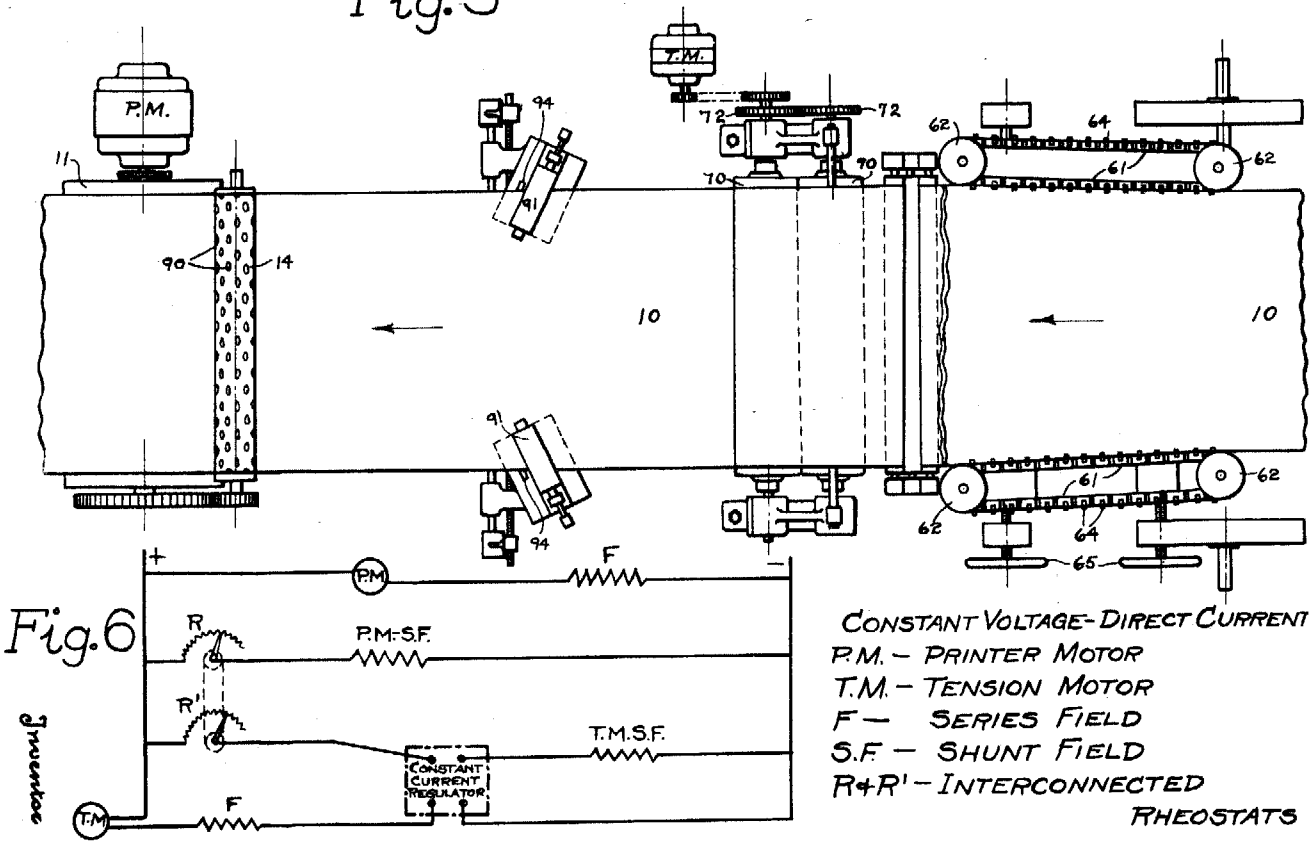
Fig. 3 is a top plan view of the spreading, tensioning, guiding and printing mechanisms which prepare the fabric for the printing operation.
Fig. 6 is a simplified wiring diagram for the apparatus.

A simplified wiring diagram is shown in Fig. 6, wherein it is assumed that a source of a direct current of constant voltage is available and drives the printer motor P. M. and the tension motor T. M. in parallel. Each has its own series field, as well as a shunt field adapted for the purpose of controlling the motor speed. By placing a rheostat in the printer motor shunt field and mechanically connecting it to another rheostat R' in the tension motor shunt field, it is possible to regulate and synchronize the speeds of the printer motor and the tension motor. A constant current regulating device of standard construction well known in the industry is so connected in the tension motor series field and shunt field as to maintain a constant current in the tension motor shunt field and thus hold the tension motor at a uniform speed and provide a uniform tension. This gives a constant tension or back pressure on the cloth as it goes forward to the printer. That is, if the speed of the printer is uniform then the tension on the cloth remains uniform because of the uniform current in the tension motor field. The speed of these motors is regulated only by varying the current in the shunt field.

A different wiring diagram is shown in Fig. 7, and as will be apparent by reference to the legends on the diagram, the direct current generator G. D. C. in the variable voltage armature circuit is driven by a suitable constant speed motor. This serves to drive the printer motor P. M. and the tension motor T. M. at constant speeds when the current is held constant. The arrangement of the fields and control circuit may be as illustrated. As therein indicated, an exciter Ex. is used to develop a direct current of constant amperage for the shunt field of the two motors and the direct current generator. A constant current regulator of standard construction which mechanically interconnects the armature and the field circuits serves to maintain a constant current in the shunt field circuit and this may be regulated as desired by the variable rheostat R. Suitable mechanism may also be employed to start and stop the motors as illustrated in the diagram, but this may be of any standard construction and need not be here described. By adjusting the rheostat R, the shunt field of the tension motor may be varied to change the back pressure or tension on the cloth. After this adjustment has been made, then that tension will remain uniform because of the constant current developed in the circuit.

The mechanical features of the hookup as shown in Figs. 1 and 2 comprise the two drums or rolls 70 so arranged that the fabric passes around them with a maximum surface constant. These drums 70 are connected by means of intermeshing gears 72 on the drum shafts so that they travel at the same speed. One of these drums is connected by a further sprocket 73 and chain 74 with a sprocket 75 on the end of the tension motor shaft. If desired, the two drums 70 may be so mounted as to be held under spring pressure in contact with opposite sides of the fabric, or other suitable mechanism may be employed to insure that the tension motor is driven at a speed determined by the movement of the fabric. Other suitable mechanisms may be employed to provide an automatically regulated tension on the fabric.

It is desirable to remove the fabric from the scray at a rate which is carefully controlled and synchronized with the movement of the cloth through the tensioning mechanism and to the printer. For this purpose, I prefer to use the mechanisms F and H whereby the tension on the fabric is employed to control the rate of speed of the driving motor 50 which removes the fabric from the scray. A simple construction for this purpose comprises a weighted and swinging lever arm 80 having a roller 81 on its end so arranged that the weight of this arm tends to hold the moving fabric 10 in a distended condition. The arm 82 of a standard or suitable rheostat connected in the shunt field of the motor 50 is arranged to be moved by the swinging arm 80. The electrical mechanisms are so connected that as the arm 80 is raised by an increase in tension on the cloth 10, this will serve to so vary the rheostat resistance as to speed up the motor 50 slightly. Then when the arm 80 swings downwardly under a decrease in tension, the rheostat will serve to slow down the speed of the motor. It will be noted that this motor 50 serves to drive both of the sets of rolls which introduce the cloth into the scray and remove it therefrom. Hence, the movement of the cloth through the scray is properly controlled by this single motor mechanism. This tensioning device H also serves to maintain a suitable tension on the cloth which is passing over the tension drums or rolls 70 and thus holds the cloth under tension throughout the length of its passage from the scray to the printer.

Figure 5:
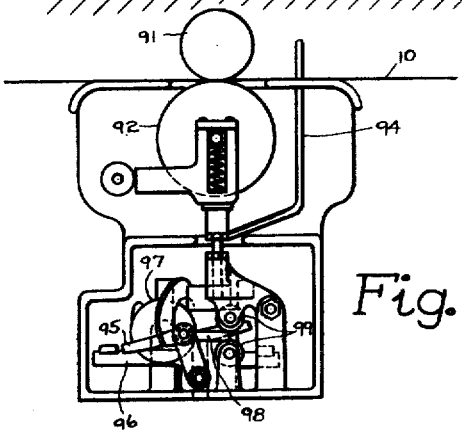
Fig. 5 is a side elevation of the spreader I of Fig. 1.

With the mechanisms thus far described the cloth is fed forward at a required rate and is maintained under tension and it has a uniform width. The printing rolls 14 are suitably arranged for printing the fabric and may have intaglio engraved surfaces 90 for that purpose. One particular feature of this invention involves so aligning or tracking the fabric with each print roll that the engraved surface 90 on the roll need not extend beyond the edges of the cloth, as shown particularly in Fig. 3; whereas, heretofore, it has been necessary to have that engraving extend some distance beyond the cloth to make up for the lateral wandering of the cloth as well as variations in its width. This alignment may be accomplished by various types of tracking devices whether operated mechanically, electrically or pneumatically. I have, however, shown diagrammatically in Figs. 1, 3 and 5 a standard Durrant guider of the type described in the patent to Durrant No. 1,569,077 of January 12, 1926.

This Durrant guider comprises two pairs of rolls 91 and 92 placed above and below the fabric and frictional contact therewith adjacent its edges. In this construction, one of the rollers 91 of each pair is rotated at a constant speed, while the other roller is arranged to be moved vertically by a cam towards and from the upper roll. The lower roll is free to be revolved by means of frictional contact with the fabric when brought into contact therewith. Each of these pairs of rolls is swiveled at an angle relative to the direction of movement of the fabric and so arranged that when gripping the fabric they tend to move it laterally towards the guide. A rocking control finger 94 is connected to control the mechanism and it is arranged to bear against the selvedge where it may be moved by a slight lateral movement of the fabric. The feeler 94 rocks the lever arm 95 so that one of its arms lies in the path of movement of the lever 96, whereby the rotating cam 97 causes the lever 95 to be pushed bodily endwise and in turn to thrust the wedge 98 between the pair of rollers 99, the upper one of which is connected to move the roll 92 into gripping engagement with the fabric and to cause lateral movement thereof until the feeler 94 serves to rock the arm 95 in the opposite direction and release the rolls 91 and 92 from the fabric. The constructional details of the mechanism may be as described in said patent, or any other suitable mechanism may be employed for the purpose. The mechanism for each of the pairs of rolls is the same, and their operation is such that the cloth is centered properly and held in substantial alignment with the edges of the engraved portion of the printing roll.

It will be appreciated that these guiders do not stretch the cloth but merely move the cloth laterally and cause it to track with the printer roll. The cloth reaches the guider in its original stretched condition as found in the roll A from which the supply was received; or it may have been stretched by means of the tentering machine C, if desired. The guiders are, however, located close to the printing machine and in such a position that the cloth moves substantially directly from these guiders to the printer.

As above explained, it is important that the back gray cloth, if used, be guided and handled properly before it meets the fabric. Hence I prefer that the mechanism for feeding the back gray cloth 12 to the printing machine substantially duplicate that above described for the fabric. The tentering frame is not ordinarily necessary, but it may be utilized, if desired. Helically threaded spreading rolls may be used in place of or to supplement the tentering frame. The back gray cloth may be supplied in rolls J (Fig. 1) and be fed into the scray K by means of the power driven rolls 101 and 102 driven by a belt connected with a pulley on the end of one of the power driven rolls 104 and 105, which remove the cloth from the scray. These parts are so arranged that the back gray feeds into the scray at a rate faster than it is removed therefrom, as above described. The motor L is connected by sprocket and chain 106 to drive this upper roll. The scray belt 107 is driven by the reduction drive 108 which comprises sprockets and chains driven by a sprocket on the shaft of the lower roll 104 or other source of power, so that the belt may move at a required slow rate. The roll 101 is preferably vertically adjustable by mechanism similar to that shown in Fig. 4, so as to stop the in-feed of the cloth without interfering with its exit from the scray.

The cloth passes through the tension control device M which has a swinging arm 110 and pulley 111 thereon adapted to swing the control arm 112 of a suitable rheostat and thus regulate the speed of the motor L as above described with reference to the cloth tensioning device. From here, the back gray cloth passes with an extensive contact around the two rolls 115 and 116 which are connected together by gears on the ends of the shafts. The tension control mechanism N may duplicate the device E above described, and its wiring arrangements may be as shown in Figs. 6 and 7, or otherwise as desired. The cloth passes through a pair of Durrant or other type of guiders O and then to a position in the rear of the fabric to be printed, as is understood. Hence, by these constructional features it is now possible to hold the back gray cloth under a given tension, as well as a given width, if desired, and to move the cloth into proper alignment with the fabric as it enters the printing machine, so that the back gray cloth will not lead the fabric astray.

The operation of the apparatus and its advantageous features have been fully described above and need not be repeated. By means of this construction, one may run a printing machine continuously although the supply of fabric comes in limited lengths, and the back gray cloth may also be in discontinuous lengths. It will also be appreciated that each of the mechanisms above described may be utilized for any useful purpose in its association with the other parts. For example, the guider may serve to register the fabric with any desired portion of the engraved surface on the printing roll, such as is required in a multi-color printing process. It will moreover be apparent that one may substitute for the mechanisms above described various mechanical equivalents, and other apparatus well known in the industry or suitable for the purpose may be utilized in cooperation with these mechanisms. Hence, the drawings and the above description are to be considered merely as illustrating the general principles of the invention and the preferred types and forms of apparatus for accomplishing the same, and these are not to be construed as imposing limitations on the invention beyond those set forth in the claims appended hereto.

I claim:

1. A textile printing apparatus comprising a printing machine having rolls and power drive therefor which draw the fabric forward at a given rate for the printing operation, means providing a supply of fabric of limited length, a receptacle for the fabric located between said supply and printing machine, means for drawing the fabric from said supply to said receptacle at a faster rate than the fabric is fed into the printing machine, so that time is provided for securing a new fabric to the end of the one in said supply while the fabric is running continuously to the printing machine, driving mechanism independent of said power drive for removing the fabric from the receptacle and means which controls the driving mechanism and insures that the fabric is held under tension as it is fed forward thereby.

2. A textile printing apparatus comprising a printing machine having rolls and associated driving mechanism for drawing fabric forward into the printing zone, means for supporting a roll of fabric to be printed, a scray arranged to hold excess fabric during its passage from said roll to the printing machine, power driven mechanism for withdrawing the fabric from the scray at the rate required for the printing operation, means for drawing the fabric from said roll to the scray at a rate faster than the fabric is withdrawn from the scray, and means for coordinating said mechanisms so that the fabric is held under tension as it is moved thereby.

3. A textile printing apparatus comprising a printing machine having a printing roll and associated power driving mechanism for drawing a strip of fabric at a controlled rate into the printing zone, means providing a supply of fabric of uncontrolled tension, independently controlled mechanism which is positively driven in the direction of fabric movement at a maximum rate less than the maximum controlled printing rate and serves to help initiate movement of the fabric when the machine is started and thereafter opposes the fabric movement when the fabric is drawn forward by the printing machine faster than the rate of said mechanism and so automatically holds the fabric under a predetermined and substantially uniform but adjustable tension as it enters the printing zone and adjustment means for adjusting the tension.

4. A textile printing apparatus comprising a printing machine having a printing roll and associated power driving mechanism for drawing a strip of fabric at a controlled rate into the printing zone, means providing a supply of fabric of uncontrolled tension, independently controlled mechanism which is positively driven in the direction of fabric movement at a maximum controlled rate less than the normal maximum controlled rate of the fabric movement caused by the printing machine and so holds the fabric under a predetermined and substantially uniform but adjustable tension when it is drawn into the printing zone at a rate exceeding that of said mechanism, and a guiding mechanism which automatically moves the tensioned fabric laterally into registration with the printing roll pattern.

5. A textile printing apparatus comprising a printing machine having a printing roll provided with a printing surface and driving means associated therewith for drawing a strip of fabric into the printing zone, stretching mechanism providing a supply of fabric, means for stretchng the moving fabric to a predetermined width, tension control mechanism located between the stretching mechanism and the printing machine which holds the fabric under a substantially uniform longitudinal tension and means independent of and located between said driving means and the stretching mechanism for guiding the stretched and tensioned fabric and automatically moving it laterally which insures substantial registration of the fabric with the printing surface.

6. A textile printing apparatus comprising a printing machine having a printing roll provided with a printing surface and means associated therewith for drawing a strip of fabric continuously into the printing zone, means providing a supply of fabric, stretching mechanism which brings the moving fabric to a substantially uniform width and independently controlled automatically operated mechanism which opposes the fabric movement caused by the printing machine and places the previously stretched fabric under a substantially uniform tension as it moves into the printing zone.

7. A textile printing apparatus comprising a printing machine having a printing roll provided with a printing surface and means associated therewith for drawing a strip of fabric into the printing zone, means providing a supply of fabric, a stretching mechanism which insures that the fabric has a substantially uniform width, means for guiding the fabric and automatically registering it with said printing surface and independently controlled mechanism which holds the fabric under a substantially uniform tension as it enters the printing zone.

8. A textile printing apparatus comprising a printing machine having a printing roll and mechanism associated therewith for feeding a strip of fabric into the printing zone, means providing a supply of fabric, positively driven mechanism for drawing the fabric forward from said supply to the printing machine and an independently controlled electrical motor brake mechanism associated therewith which is positively driven in the direction of fabric movement at a maximum rate less than the maximum rate of the fabric and so opposes the fabric movement when the fabric is moved by the printing machine faster than the rate of the motor brake mechanism and which automatically holds the cloth under a predetermined substantially uniform but adjustable longitudinal tension as it enters the printing zone and an electrical control device governing said brake mechanism for adjusting that tension for a given printing rate.

9. A textile printing apparatus comprising a printing machine having a printing roll and associated power driving mechanism for driving a strip of fabric and an associated back gray cloth at a controlled rate into the printing zone, means providing a supply of back gray cloth of uncontrolled tension, independently controlled electrical motor brake mechanism which is positively driven in the direction of cloth movement at a maximum rate less than the maximum rate of the cloth and so opposes the cloth movement when the cloth is moved by the printing machine faster than the rate of the motor brake mechanism and which automatically holds it under a predetermined and substantially uniform but adjustable tension as it enters the printing zone, and an electric control device governing the brake mechanism for adjusting the tension of the cloth for a given printing plate.

10. A textile printing apparatus comprising a printing machine having a printing roll and driving mechanism associated therewith for drawing a strip of fabric into the printing zone, means providing a supply of fabric, a scray, manually controlled mechanism for feeding the fabric from the supply into the scray or for stopping the feeding motion, driving mechanism for withdrawing the fabric continuously from the scray at a rate slower than that at which the fabric is fed into the scray, so that the fabric may be fed from the scray after said supply has become exhausted, and means for coordinating said mechanisms and controlling the tension on the fabric as it is moved thereby.

11. A textile printing apparatus comprising a printing roll and backing cylinder and mechanism cooperating therewith for drawing a strip of fabric and an associated back gray cloth through the printing zone, means providing a supply of back gray cloth, a scray, means for feeding the back gray cloth from said supply to the scray at a given rate, mechanism for withdrawing the back gray cloth from the scray at a lesser rate and for feeding the same forward to the printing zone, whereby a new cloth may be secured to the end of the old one without stopping the printing operation, and means which coordinates said mechanisms and insures that the cloth is fed to the printing zone under tension.

12. A textile printing apparatus comprising a printing machine having a printing roll and power driven mechanism for drawing both a fabric and a back gray cloth into the printing zone, means providing supplies of the fabric and cloth, a scray associated with each supply, and means for feeding the fabric and the cloth from their supplies into their respective scrays at rates which exceed that of the movement of the fabric into the printing zone so that a new fabric and a new cloth may be secured to the ends of the ones passing through the printing zone without stopping the printing operation.

13. A textile printing apparatus comprising a printing machine having a printing roll and power driven mechanism for drawing both the fabric and a back grey cloth into the printing zone, separate automatically actuated electrical brake mechanisms which aid initially in starting movement of the fabric and cloth and thereafter oppose the movement caused by the printing machine and thus hold each under a substantially uniform tension as it enters the printing zone, and independently actuated means for guiding and laterally moving both the fabric and the cloth while held under uniform tension so that they are brought into registration as they enter the printing zone.

STEPHEN B. STAFFORD.

REFERENCES CITED

The following references are of record in the file of this patent:

UNITED STATES PATENTS

| Number | Name | Date |
|---|---|---|
| 196,296 | Haworth | Oct. 23, 1877 |
| 2,033,625 | French | Mar. 10, 1936 |
| 2,158,027 | Bulford | May 9, 1939 |
| 2,170,578 | Sperry | Aug. 22, 1939 |

FOREIGN PATENTS

| Number | Country | Date |
|---|---|---|
| 315 | Great Britain | Oct. 4, 1895 |
| 870 | Great Britain | Oct. 15, 1855 |
| 5,604 | Great Britain | Jan. 15, 1895 |
| 6,178 | Great Britain | Jan. 2, 1901 |

Certificate of Correction

Reissue No. 22,942. November 25, 1947.

STEPHEN B. STAFFORD

It is hereby certified that errors appear in the printed specification of the above numbered patent requiring correction as follows: Column 11, line 45, claim 5, for "stretching mechanism" read *means*; line 46, for the word "means" read *stretching mechanism*; same line 46, for "stretchng" read *stretching*; column 12, line 46, claim 9, for "plate" read *rate*; and that the said Letters Patent should be read with these corrections therein that the same may conform to the record of the case in the Patent Office.

Signed and sealed this 3rd day of February, A. D. 1948.

[SEAL]

THOMAS F. MURPHY,
*Assistant Commissioner of Patents.*